F. E. FISHER.
AUTOMOBILE.
APPLICATION FILED JULY 3, 1916.
1,331,492.
Patented Feb. 24, 1920.
4 SHEETS—SHEET 1.
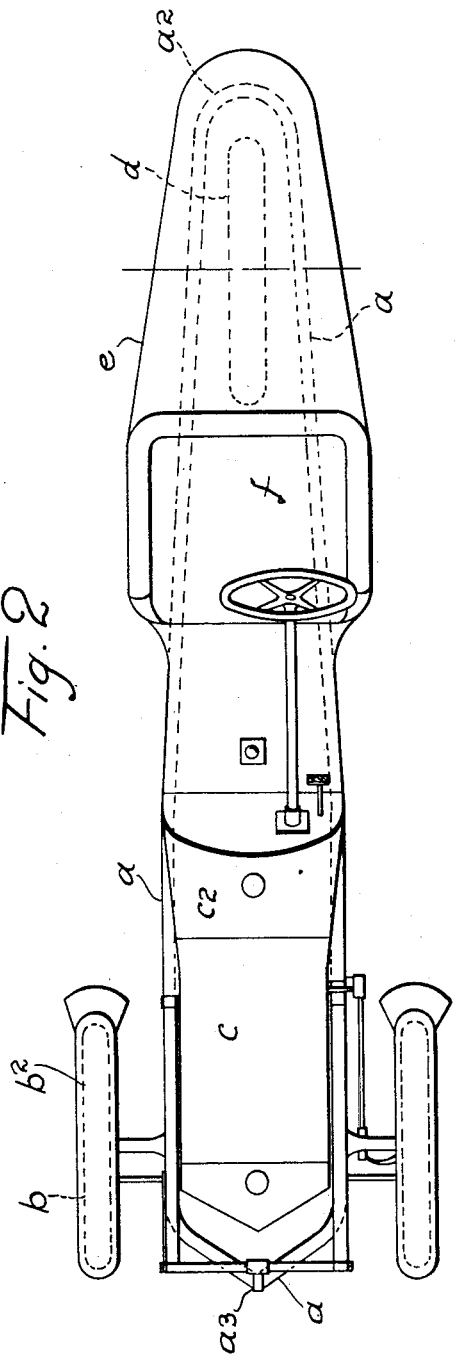
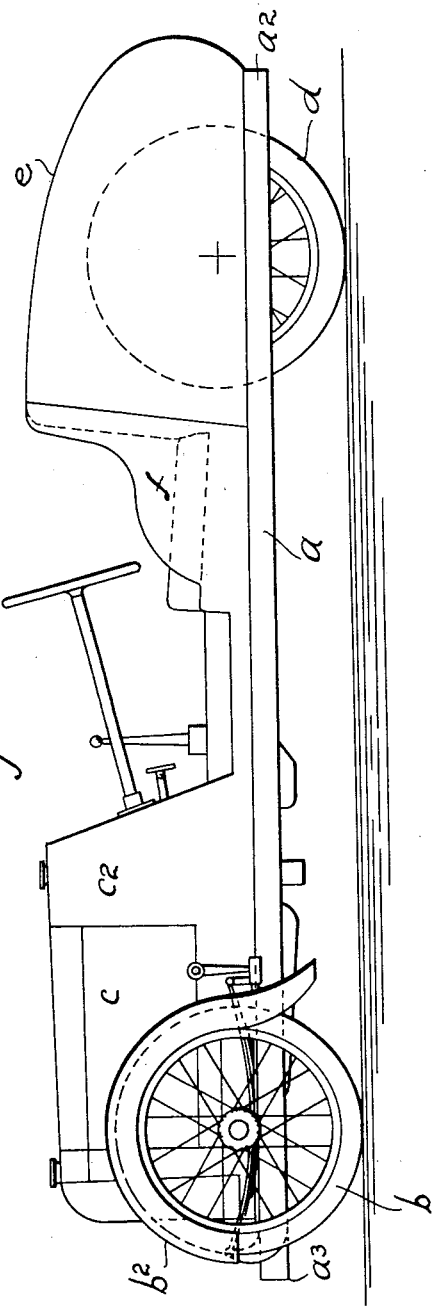
INVENTOR
Frederick E. Fisher
BY Ralzemond A. Parker
ATTORNEY

F. E. FISHER.
AUTOMOBILE.
APPLICATION FILED JULY 3, 1916.

1,331,492.

Patented Feb. 24, 1920.
4 SHEETS—SHEET 2.

INVENTOR
Frederick E. Fisher
BY Ralzemond A. Parker
ATTORNEY

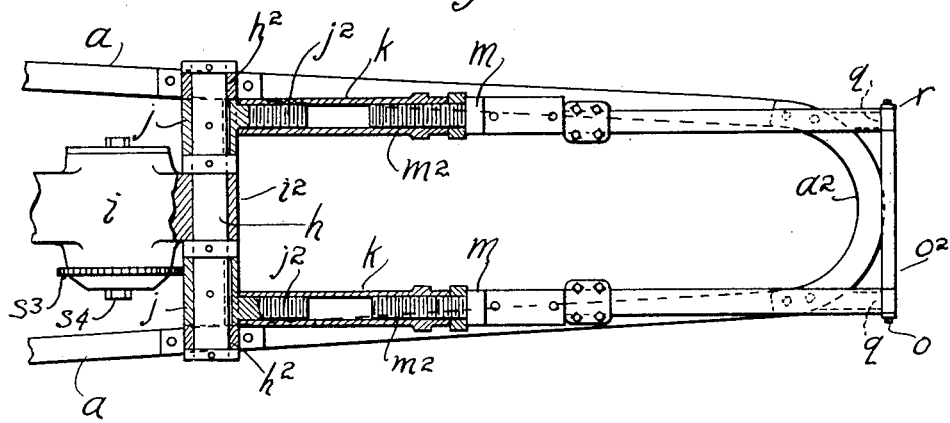
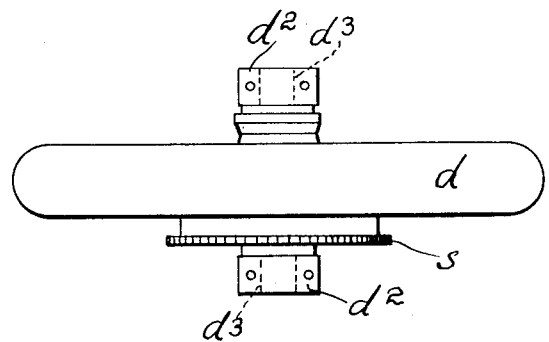
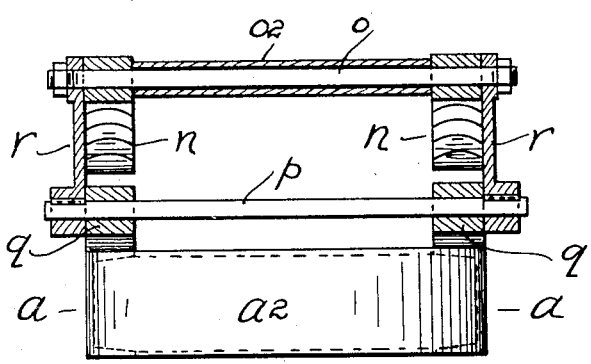

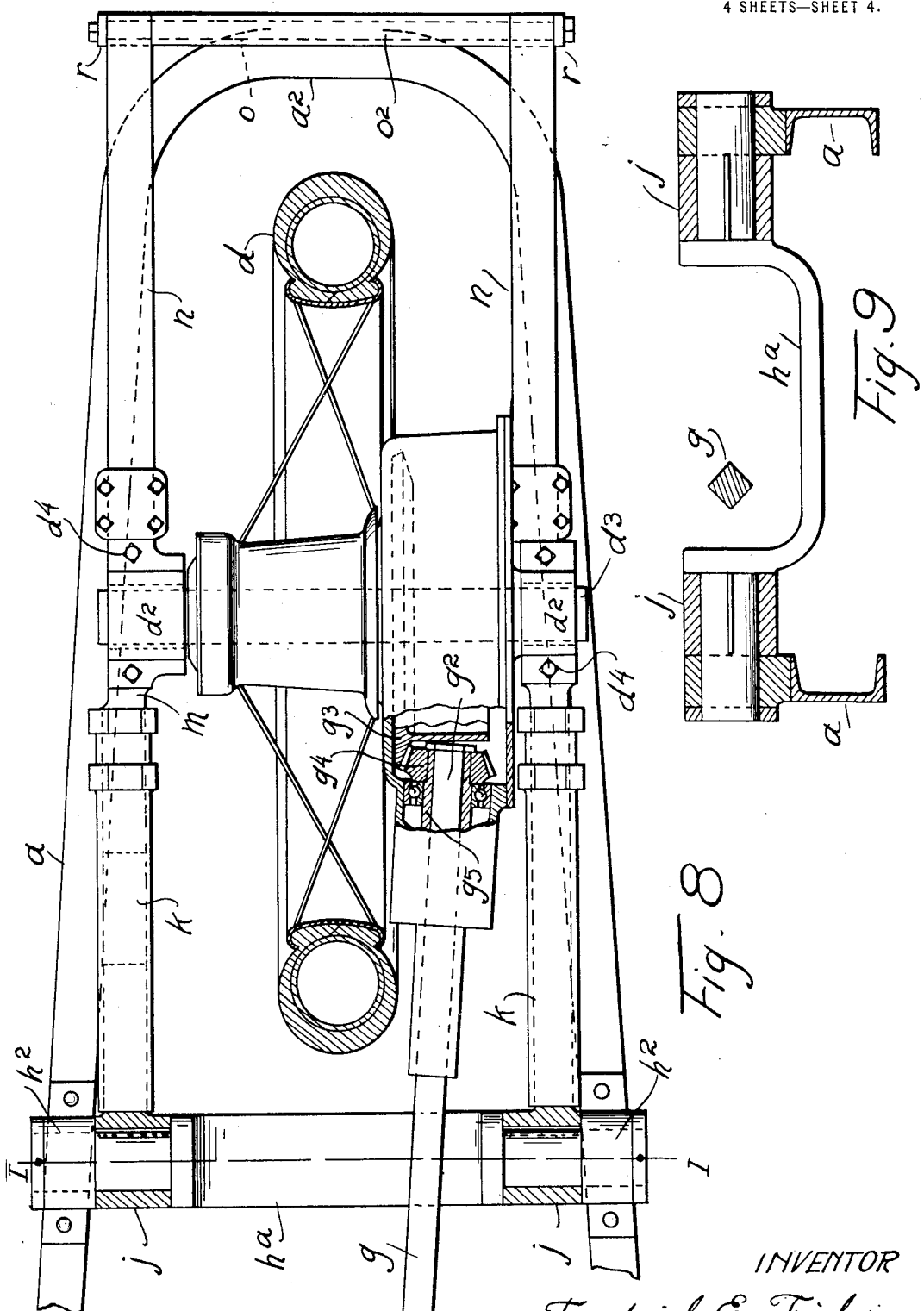

UNITED STATES PATENT OFFICE.

FREDERICK E. FISHER, OF BALTIMORE, MARYLAND.

AUTOMOBILE.

1,331,492.  Specification of Letters Patent.  Patented Feb. 24, 1920.

Application filed July 3, 1916. Serial No. 107,232.

*To all whom it may concern:*

Be it known that I, FREDERICK E. FISHER, a subject of the King of England, residing at Baltimore, State of Maryland, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

My invention relates to automobiles and especially to that class which employ three wheels and among other improvements I secure special strength in the chassis or frame, an improved construction of the mounting for the driving wheel and an improved appearance.

In the accompanying drawings:

Figure 1 is a side view of an automobile embodying my invention.

Fig. 2 is a plan view of the same.

Fig. 5 is a plan view similar to Fig. 4, the transmission chain and driving-wheel being removed and parts shown in section.

Fig. 6 is a detail view of the driving-wheel removed from the machine.

Fig. 7 is a detail sectional elevation illustrating the means for securing the ends of the springs.

Fig. 8 is a plan view to an enlarged scale of the rear part of an automobile embodying my invention when a shaft transmission is used exclusively.

Fig. 9 is a section on the line I—I Fig. 8.

Figure 4:
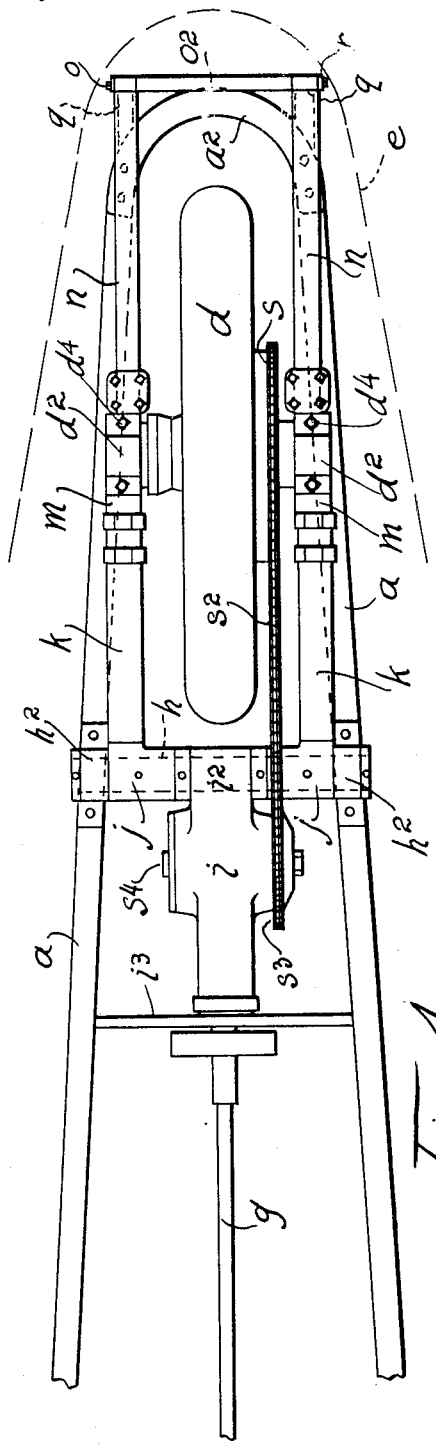
Fig. 4 is a plan view of the parts shown in Fig. 3, the seat and wheel cover being removed.
Figure 3:
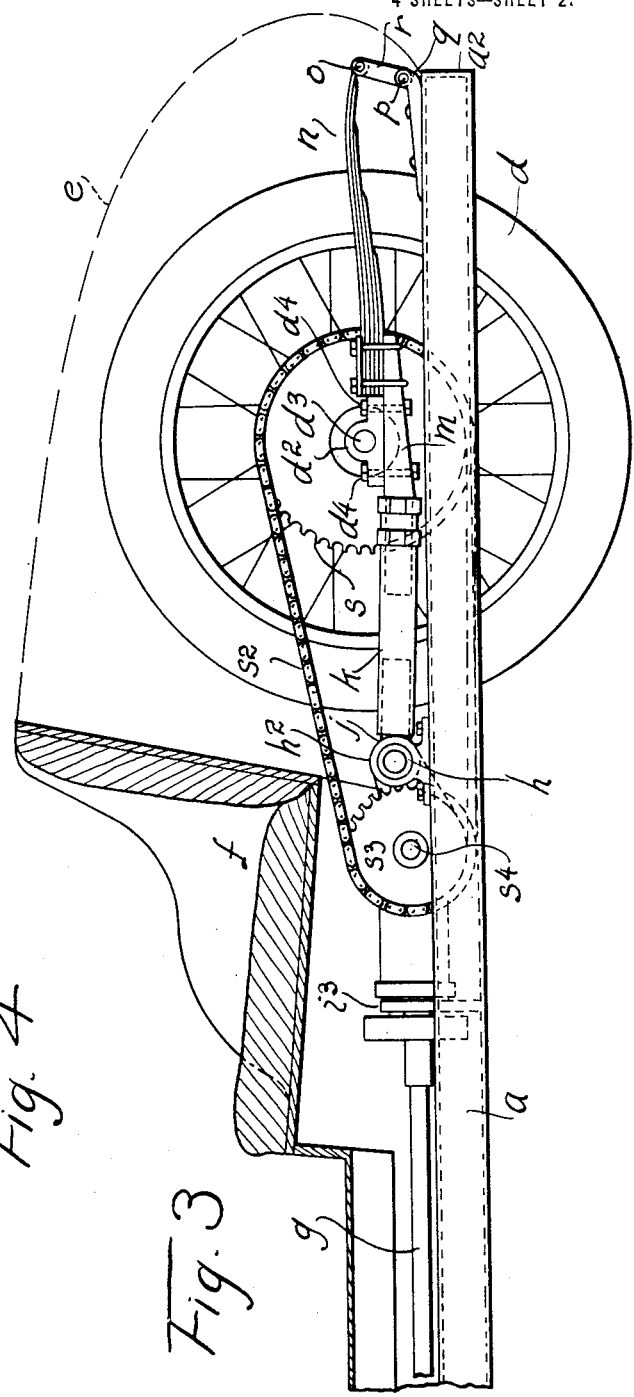
Fig. 3 is an enlarged view in elevation, of the rear portion, some of the parts being in section and some removed to show the construction more clearly.

$a$ is the chassis or frame. This is preferably constructed of a single piece of three inch channel iron bent into the shape shown in Fig. 2 so that the approximately parallel side pieces of the frame, or chassis, are united by a loop $a^2$ into which the channel iron is bent at the rear. The ends of the piece of channel iron are brought together at the front $a^3$ and welded to complete the frame.

$b$ $b$ are the front wheels pivoted for being turned to steer the vehicle in the usual way. Each of these wheels carries with it a wheel guard $b^2$ which is mounted to turn with the wheel.

$c$ is a hood inclosing the engine. The gasolene reservoir is located at $c^2$.

$d$ is the rear wheel, the axle $d^3$ of which is adapted to rotate in removable bearings or brackets $d^2$ $d^2$, which are secured to the side pieces of the frame toward the rear of the same.

The side pieces of the frame converge toward the rear as shown and the bearings for the driving wheel are close to the wheel.

$e$ is a hood completely covering the rear of the frame and the driving wheel $d$ and the parts adjacent thereto. $f$ is the seat of the vehicle. $g$ is a transmission shaft.

$h$ is a hollow shaft extending transversely across the frame just in front of the driving wheel $d$ and resting in bearing $h^2$ $h^2$ on the side pieces of the frame and adapted to turn therein. $i$ is a housing having a sleeve $i^2$ passing over the shaft $h$ at its center. $i^3$ is a supporting piece or bracket extending transversely across the frame $a$ and secured at its ends to the side pieces thereof. The end of the housing $i$ opposite to that sleeved at $i^2$ to the shaft $h$ is secured and supported by the cross piece $i^3$. $j$ $j$ are sleeves keyed upon the shaft $h$ toward the ends of said shafts. The sleeves $j$ $j$ are provided with screw threaded shanks $j^2$ (Fig. 5) which engage interior threads in the sleeves $k$ $k$. $m$ $m$ are supporting pieces having screw threaded shanks $m^2$ $m^2$ engaging interior threads on the sleeves $k$ $k$ at the end of said sleeves opposite to that engaged by the screw threaded shank $j^2$ $j^2$. $n$ $n$ are cantaliver springs, one of which is secured to each of the supporting pieces $m$ at its rear and extends to the rear end of the frame $a$. $q$ $q$ are bearings supported by the rear end of the frame $a$ and $p$ is a rod extending transversely of said frame and resting and adapted to turn in said bearings. $r$ $r$ are links keyed to the ends of the shaft $p$ and extending upwardly therefrom. $o$ is a rod bearing in the outer ends of links $r$ $r$. The rear ends of the cantaliver springs $n$ $n$ pass around and engage the rod $o$ toward the ends of said rod. $o^2$ (Fig. 7) is a spacing sleeve upon the rod $o$ between the springs $n$ $n$.

The brackets $d^2$ carry bearings for the rear axle $d^3$ and are secured to the supporting pieces $m$ $m$ by bolts $d^4$ $d^4$. By loosening these bolts the rear wheel *d* may be removed without disturbing the adjustment of the bearings and parts. *s* is a sprocket wheel secured to the driving wheel *d* concentric therewith. *s*⁴ is a jack-shaft resting in bearings in the housing *i* and having the usual bevel or worm gearing and mechanism by which motion is imparted to it from the transmission shaft *g* which is a usual construction and is therefore not specifically illustrated or described. *s*³ is a sprocket wheel on an outer end of the jack-shaft *s*⁴. *s*² is a sprocket chain passing over the sprocket wheels *s* and *s*³.

In the modification shown in Fig. 8 the transmission shaft *g* passes immediately to the wheels *g*³ *g*⁴ through which motion is communicated to the driving wheel *d*. The transmission shaft *g* has a squared end *g*² which removably engages in the sleeve *g*⁵ of the gear wheel *g*⁴. In the modification of Figs. 8 and 9 the shaft *ha* corresponding to *h* of the other figures is bent down at its center, as shown most clearly in Fig. 9, to permit the passage of the transmission shaft *g*.

The construction by which the frame is made out of a single integral piece secures stability and strength.

By securing the driving wheel to arms adapted to oscillate but rigidly secured in the same plane, the necessary resilient connection between the frame and wheel may be secured while at the same time holding the axle in a plane parallel to that of the frame.

By locating the driving wheel entirely within the frame, the frame acts as a shield for the wheel and a hood-like construction may be used covering the rear of the frame and driving wheel and adjacent parts, thus protecting this mechanism and securing a neat and acceptable appearance at this point. By turning the sleeves *h h* the plane of the driving wheel may be accurately adjusted.

While the above construction is shown with an underslung frame, the same construction is obviously adapted to the overslung type. By this construction I also obtain a four-point support for the driving wheel.

What I claim is:

1. In an automobile, a frame, a single driving wheel, two rigid arms extending on opposite sides of said driving wheel, a shaft pivoted to said frame, said arms being rigidly secured to said shaft and a bearing for said wheel on each of said arms at a distance from said shaft.

2. In an automobile, a frame, a single driving wheel, two rigid arms extending on opposite sides of said driving wheel, a shaft pivoted to said frame, said arms being rigidly secured to said shaft and a bearing for said wheel on each of said arms at a distance from said shaft, and a resilient connection between said arms and said shaft.

3. In an automobile, a frame, a single driving wheel, an arm extending on each side of said driving wheel, a shaft pivoted to said frame, said arms being rigidly secured to said shaft, said wheel having a bearing on each of said arms at a distance from said shaft, a cantaliver spring secured to the outer end of each of said arms and extending beyond the same, and a link pivoted to the outer end of each of said springs and to said frame.

4. In an automobile, a frame, a single driving wheel, an arm extending on each side of said driving wheel, a shaft pivoted to said frame, said arms being rigidly secured to said shaft, said wheel having a bearing on each of said arms at a distance from said shaft, a cantaliver spring secured to the outer end of each of said arms and extending beyond the same, and a link pivoted to the outer end of each of said springs and said frame, said links being constrained to oscillate in the same plane.

5. In a three-wheeled automobile, a single driving wheel located toward one end thereof, a frame having the side pieces closely adjacent to said wheel upon opposite sides thereof, said side pieces passing around said wheel at the end of the automobile, and a hood covering said driving wheel resting upon said side pieces and their connecting part and conforming to the shape of said side pieces and connecting part.

6. In a three-wheeled automobile, a single driving wheel, a frame and apparatus resiliently supported upon said frame and secured thereto at four points approximately in a horizontal plane and at the corners of a parallelogram, said wheel having its bearings upon said apparatus between said points.

7. In an automobile, a frame, a single driving wheel, an arm extending on each side of said driving wheel, a shaft pivoted to said frame, said arms being rigidly secured to said shaft, said wheel having a bearing on each side of said arm at a distance from said shaft, a cantaliver spring secured to the outer end of each of said arms and extending beyond the same, and means for securing the outer ends of said springs to the frame.

8. In a three-wheeled automobile, a single driving wheel located toward one end thereof, a frame having the side pieces closely adjacent to said wheel upon opposite sides thereof, said side pieces passing around said wheel at the end of the automobile, and a hood covering said driving wheel resting upon said side pieces and their connecting part and conforming to the shape of said side pieces and connecting part, the other two wheels being pivoted to act as steering wheels, and wheel guards secured to the support of said wheels and turned with them about their pivots.

9. In an automobile, a frame, a single driving wheel, an arm extending on each side of said driving wheel, a shaft pivoted to said frame, said arms being rigidly secured to said shaft, said wheel having a bearing on each of said arms at a distance from said shaft, a cantaliver spring secured to the outer end of each of said arms and extending beyond the same, and a link pivoted to the outer end of each of said springs and said frame, said links being keyed to said shaft.

10. In an automobile, a frame, a single driving wheel, two rigid arms extending on opposite sides of said driving wheel, a shaft pivoted to said frame, said arms being rigidly secured to said shaft and a bearing for said wheel on each of said arms at a distance from said shaft, said shaft being bent out of line between its ends, a driving shaft for said wheel, said driving shaft passing approximately between the ends of the first named shaft.

In testimony whereof I sign this specification.

FREDERICK E. FISHER.

Witness:
JOHN G. SCHLAFFER.